United States Patent
Mochida et al.

(10) Patent No.: US 9,983,570 B2
(45) Date of Patent: May 29, 2018

(54) MULTIPLE SYSTEM NUMERICAL CONTROL DEVICE

(71) Applicant: FANUC Corporation, Minamitsuru-gun, Yamanashi (JP)

(72) Inventors: Takeshi Mochida, Minamitsuru-gun (JP); Keiichiro Miyajima, Minamitsuru-gun (JP)

(73) Assignee: FANUC Corporation, Minamitsuru-gun, Yamanashi (JP)

( * ) Notice: Subject to any disclaimer, the term of this patent is extended or adjusted under 35 U.S.C. 154(b) by 237 days.

(21) Appl. No.: 14/948,514

(22) Filed: Nov. 23, 2015

(65) Prior Publication Data
US 2016/0154399 A1    Jun. 2, 2016

(30) Foreign Application Priority Data

Nov. 27, 2014 (JP) ................................ 2014-240279

(51) Int. Cl.
*G06F 19/00* (2018.01)
*G05B 19/41* (2006.01)

(52) U.S. Cl.
CPC .... *G05B 19/41* (2013.01); *G05B 2219/34179* (2013.01)

(58) Field of Classification Search
None
See application file for complete search history.

(56) References Cited

U.S. PATENT DOCUMENTS 5,309,074 A * 5/1994 Mizukami ............ G05B 19/416
                                                        318/571
6,401,005 B1 * 6/2002 Schwarz ............ G05B 19/4093
                                                        700/159
(Continued)

FOREIGN PATENT DOCUMENTS

CN    101458509 A    6/2009
CN    102016733 A    4/2011
(Continued)

OTHER PUBLICATIONS

Decision to Grant a Patent dated Oct. 25, 2016 in Japanese Patent Application No. 2014-240279 (3 pages) with an English Translation (3 pages).

(Continued)

*Primary Examiner* — Miranda Huang
*Assistant Examiner* — Hung Dang
(74) *Attorney, Agent, or Firm* — Drinker Biddle & Reath LLP

(57) ABSTRACT

A multiple system numerical control device for executing multiple system control for dividing plural axes to be controlled to plural systems and controlling each system based on different machining program in parallel, wherein, the plural systems includes a normal interpolation period system configured to operate at normal interpolation period and control a first control axis, and a high speed interpolation period system configured to operate at high speed interpolation period shorter than the normal interpolation period and control a second control axis, and processing in the normal interpolation period system executed in a first interpolation processing unit, a first coordinate update processing unit, and a data management information generation unit are executed plural times in a normal interpolation period according to system ratio of the normal interpolation period and the high speed interpolation period.

4 Claims, 6 Drawing Sheets

(56) References Cited

U.S. PATENT DOCUMENTS

| | | |
|---|---|---|
| 6,731,090 B1 | 5/2004 | Tanaka et al. |
| 2004/0039476 A1 | 2/2004 | Iihoshi et al. |
| 2005/0283269 A1* | 12/2005 | Genma ............. G05B 19/4068 700/177 |
| 2008/0103625 A1 | 5/2008 | Mochida et al. |
| 2009/0153092 A1 | 6/2009 | Hosokawa et al. |
| 2010/0185316 A1 | 7/2010 | Yamada |
| 2011/0035044 A1 | 2/2011 | Takahashi et al. |
| 2013/0087536 A1 | 4/2013 | Suzuki et al. |

FOREIGN PATENT DOCUMENTS

| | | |
|---|---|---|
| CN | 103028846 A | 4/2013 |
| JP | S61-103735 A | 5/1986 |
| JP | H05-324046 A | 12/1993 |
| JP | 2004-086306 A | 3/2004 |
| WO | WO-01/44882 A1 | 6/2001 |
| WO | WO-2008/136110 A1 | 11/2008 |

OTHER PUBLICATIONS

The Notification of the First Office Action issued in Chinese Patent Application No. 2015108495149 dated Sep. 8, 2017 (5 pages) with an English translation (7 pages).

* cited by examiner

# MULTIPLE SYSTEM NUMERICAL CONTROL DEVICE

RELATED APPLICATION DATA

This application claims priority under 35 U.S.C. § 119 and/or § 365 to Japanese Application No. 2014-240279 filed Nov. 27, 2014, the entire contents is incorporated herein by reference.

BACKGROUND OF THE INVENTION

1. Field of the Invention

The present invention relates to a numerical control device, and more specifically a numerical control device having plural systems capable of high speed response for transmitting information between systems at high speed.

2. Description of the Related Art

The present invention relates to a numerical control device, and more specifically a numerical control device having plural systems capable of high speed response for transmitting information between systems at high speed.

In a numerical control device used for control of an industrial machinery and the like, a numerical control device is included which divides plural axes to be controlled to plural groups (systems) and controls each group in parallel (for example, Japanese Patent Laid-Open No. 05-324046, Japanese Patent Laid-Open No. 2004-086306, etc.) In the numerical control device, axis control period (interpolation period) of each axis is generally same, and a multiple control for controlling each axis with different interpolation period is not especially performed.

During performing of the multiple system control, when an information generated at an interpolation period of a system is tried to be read by other system, since usually order of each processing such as information generation processing and information reference processing executed in each system is not determined, it is impossible to securely read the information at the same interpolation period to be read in the next interpolation period as shown in FIG. 7.

Therefore, control which requires closer synchronization (high speed response) between systems by reading an information generated in a system by the other system can not be implemented. For example, even when, based on information of operation status of program or current position of a system, operation of program of the other system is required to be immediately started, since delay for interpolation period is generated by the above restraint, it is difficult to implement high speed response.

A specific example having the problem of the delay for an interpolation period is described below. FIG. 8 is a schematic diagram illustrating gap control in which a numerical control device is automatically moved up and down according to positioning operation in horizontal axes (X axis and Y axis). Conventionally, it is possible to make gap control axis move in synchronization with the horizontal plane axes, since the up/down motion of the gap control axis is controlled in the same system, for gap control. However, since the up/down motion of the gap control axis is automatically operated by the numerical control device at present, the machine manufacturer can not uniquely customize the operation.

For enabling the customizing of the up/down motion, gap control method by multiple system type for controlling the gap control axis by other system than a system for controlling the plane axes. Here, as an example using program operation which operates the gap control axis, a method for starting axis movement by a cycle start signal.

In the method, when the multiple system control is introduced as it is, since starting of the motion of the gap control axis is delayed by an interpolation period to the motion of the plane axes, delay between the systems may cause contact of a nozzle and a workpiece at starting of positioning when a machining head moves at high speed, or completion of positioning may be not in time for starting of the next machining causing machining defect.

To solve the problem, a method in which interpolation periods of all systems are shortened to be a high speed interpolation period when the multiple system control is introduced. However, when all systems are operated at the high speed interpolation period, a CPU is significantly burdened and a high capacity CPU is required. Thus the method is not cost effective way.

SUMMARY OF THE INVENTION

In view of the above-described problems in the prior art techniques, an object of the present invention is accordingly to provide a multiple system numerical control device having plural systems capable of high speed response for transmitting information between systems at high speed.

A multiple system numerical control device according to the present invention is the multiple system numerical control device for executing multiple system control for dividing plural axes to be controlled to plural systems and controlling each system based on different machining program in parallel, wherein, the plural systems includes a normal interpolation period system configured to operate at normal interpolation period and control a first control axis, and a high speed interpolation period system configured to operate at high speed interpolation period shorter than the normal interpolation period and control a second control axis, the normal interpolation period system includes, a first command analysis unit configured to analyze a first machining program and generate a first command data, a first interpolation processing unit configured to execute interpolation processing based on the first command data and generate a first interpolation data, a first coordinate update processing unit configured to update coordinate value of the first control axis based on the first interpolation data, a first acceleration/deceleration processing unit configured to execute acceleration/deceleration processing based on the coordinate value of the first control axis and generate a first acceleration/deceleration data, a data management information generation unit configured to generate data management information representing status of the normal interpolation period system based on at least one of the first command date, the first interpolation data, and the coordinate value of the first control axis, and a data management information storing unit configured to store the data management information; and the high speed interpolation system includes, a second command analysis unit configured to analyze a second machining program and generate a second command data, a second interpolation processing unit configured to execute interpolation processing based on the second command data and generate a second interpolation data, a second coordinate update processing unit configured to update coordinate value of the second control axis based on the second interpolation data, a second acceleration/deceleration processing unit configured to execute acceleration/deceleration processing based on the coordinate value of the second control axis and generate a second acceleration/deceleration data, and a data management information confirmation unit configured to control operation of the second command analysis unit, the second interpolation processing unit, the second coordinate value update processing unit, and the second acceleration/deceleration processing unit, wherein, processing in the normal interpolation period system executed in the first interpolation processing unit, the first coordinate update processing unit, and the data management information generation unit are executed plural times in a normal interpolation period according to system ratio of the normal interpolation period and the high speed interpolation period.

A multiple system numerical control device according to the present invention is the multiple system numerical control device for executing multiple system control for dividing plural axes to be controlled to plural systems and controlling each system based on different machining program in parallel, the multiple system numerical control device including a programmable controller, wherein, the plural systems includes a normal interpolation period system configured to operate at normal interpolation period and control a first control axis, and a high speed interpolation period system configured to operate at high speed interpolation period shorter than the normal interpolation period and control a second control axis, the normal interpolation period system includes, a first command analysis unit configured to analyze a first machining program and generate a first command data, a first interpolation processing unit configured to execute interpolation processing based on the first command data and generate a first interpolation data, a first coordinate update processing unit configured to update coordinate value of the first control axis based on the first interpolation data, a first acceleration/deceleration processing unit configured to execute acceleration/deceleration processing based on the coordinate value of the first control axis and generate a first acceleration/deceleration data, a data management information generation unit configured to generate data management information representing status of the normal interpolation period system based on at least one of the first command date, the first interpolation data, and the coordinate value of the first control axis, and a data management information storing unit configured to store the data management information, and the high speed interpolation system includes, a second command analysis unit configured to analyze a second machining program and generate a second command data, a second interpolation processing unit configured to execute interpolation processing based on the second command data and generate a second interpolation data, a second coordinate update processing unit configured to update coordinate value of the second control axis based on the second interpolation data, and a second acceleration/deceleration processing unit configured to execute acceleration/deceleration processing based on the coordinate value of the second control axis and generate a second acceleration/deceleration data, wherein the programmable controller is configured to output a signal to control operation of the second command analysis unit, the second interpolation processing unit, the second coordinate value update processing unit, and the second acceleration/deceleration processing unit to the high speed interpolation system based on the data management information stored in the data management information storing unit, and processing in the normal interpolation period system executed in the first interpolation processing unit, the first coordinate update processing unit, and the data management information generation unit are executed plural times in a normal interpolation period according to system ratio of the normal interpolation period and the high speed interpolation period.

The data management information may include at least one of sequence number of a currently executed block of the first machining program executed in the normal interpolation period system, overlap timing, and 1 ms current coordinate value of the normal control axis.

The present invention, with the above configuration, enables closer synchronization control by reading information generated in the system operating at the normal interpolation period at high speed using the high speed interpolation system. With the configuration, for example, program operation in the system which requires high speed response can be started at high speed, and waiting time for starting operation of the program in the high speed interpolation period system is reduced, enabling closer synchronization control. In addition to that, high speed response control of axis control (for example, axis control such as PMC axis control) using signal can be implemented.

BRIEF DESCRIPTION OF THE DRAWINGS

The above-described object, the other object, and the feature of the invention will be proved from the description of embodiments below with reference to the accompanying drawings. In these drawings.

DETAILED DESCRIPTION OF THE PREFERRED EMBODIMENTS

Embodiments of the present invention will be described with reference to the drawings. Technical features in the present invention are outlined first.

A multiple system numerical control device for executing multiple system control in the present invention executes control processing by setting a shorter interpolation period of system in plural systems, which requires high speed response, than a normal interpolation period. Hereinafter, the system which requires high speed response will be referred to as a high speed interpolation period system. The high speed interpolation period system refers to information in the normal interpolation period system. The normal interpolation period system loops processing of starting of block, interpolation, and update of the coordinate at system ratio of high speed response at the high speed interpolation period system for multiple times, and generates information for each period corresponding to interpolation period of the high speed interpolation period system. The high speed interpolation period system generates plural pieces of information by executing the program for plural times at the normal interpolation period, in addition to information prescribing at which interpolation period of the high speed interpolation period system each piece of information can be referred to. Then the high speed interpolation period system reads these pieces of information.

The information of the normal interpolation period system can be referred to at higher speed by monitoring the information completely generated at the normal interpolation period system in the method described above using unique processing on the high speed interpolation period system side.

The method for referring to the information by the high speed interpolation period system includes a method (a method a) of referring to the information at the nearest high speed interpolation period each time when the information is generated, and a method (a method b) of sequentially referring to the information at each interpolation period.

Control such as starting of operation of program at the high speed interpolation period system, starting of movement by axis control (axis control such as PMC axis control) by signal, and execution of macro program, are executed at the high speed interpolation period system, based on the information generated in the normal interpolation period system, status information of the normal interpolation period system, and the like.

Figure 1:
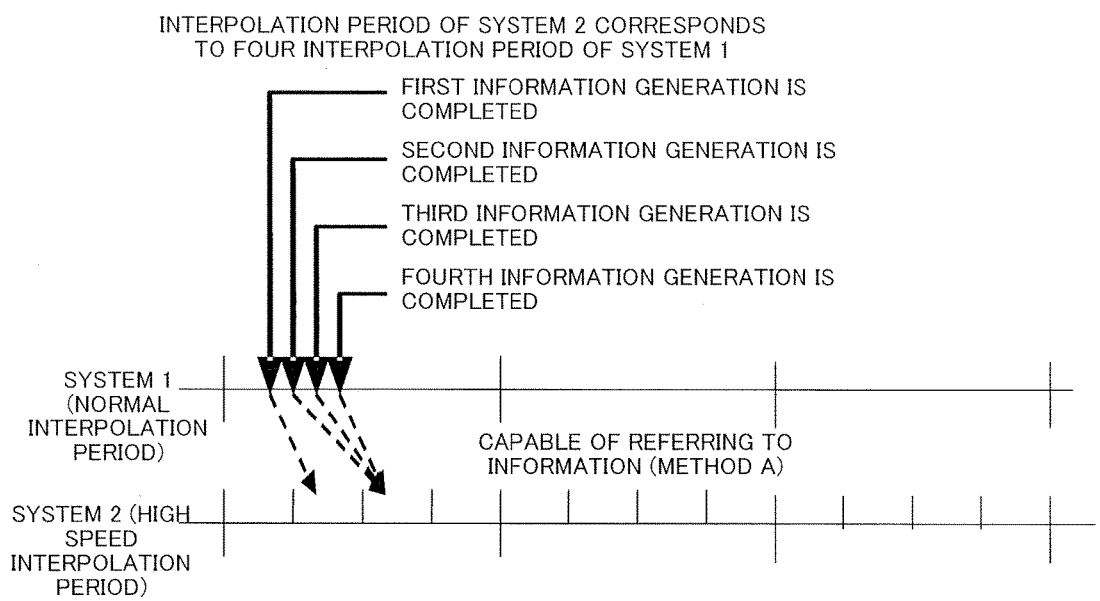
FIG. 1 is a diagram illustrating a method for referring information generated in a normal interpolation period system at the closest high speed interpolation period according to an embodiment of the present invention.
Figure 2:
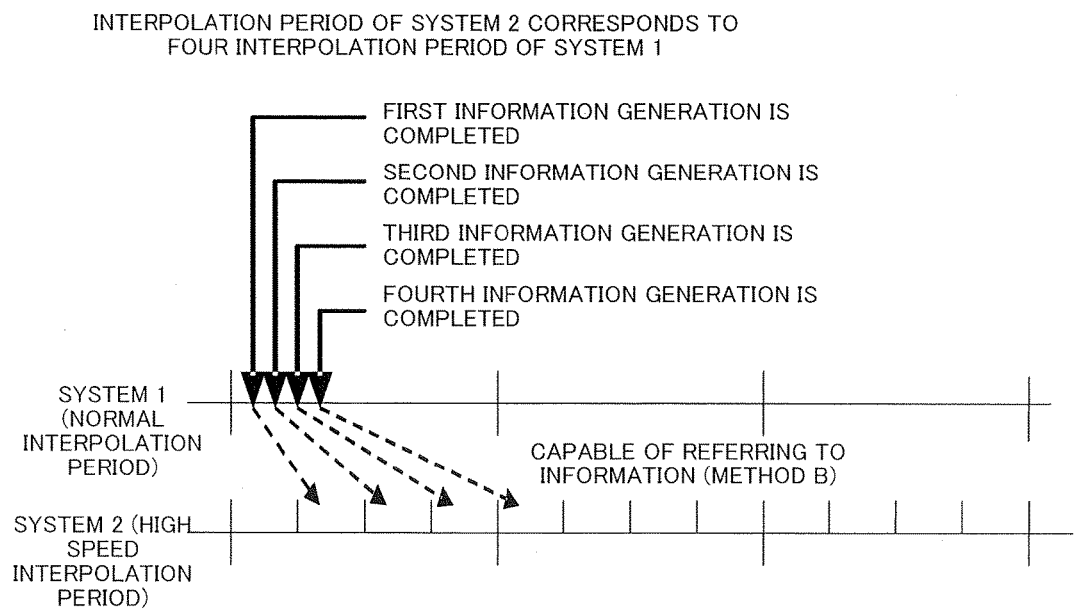
FIG. 2 is a diagram illustrating a method for referring information generated in a normal interpolation period system sequentially at a high speed interpolation period according to an embodiment of the present invention.
Figure 3:
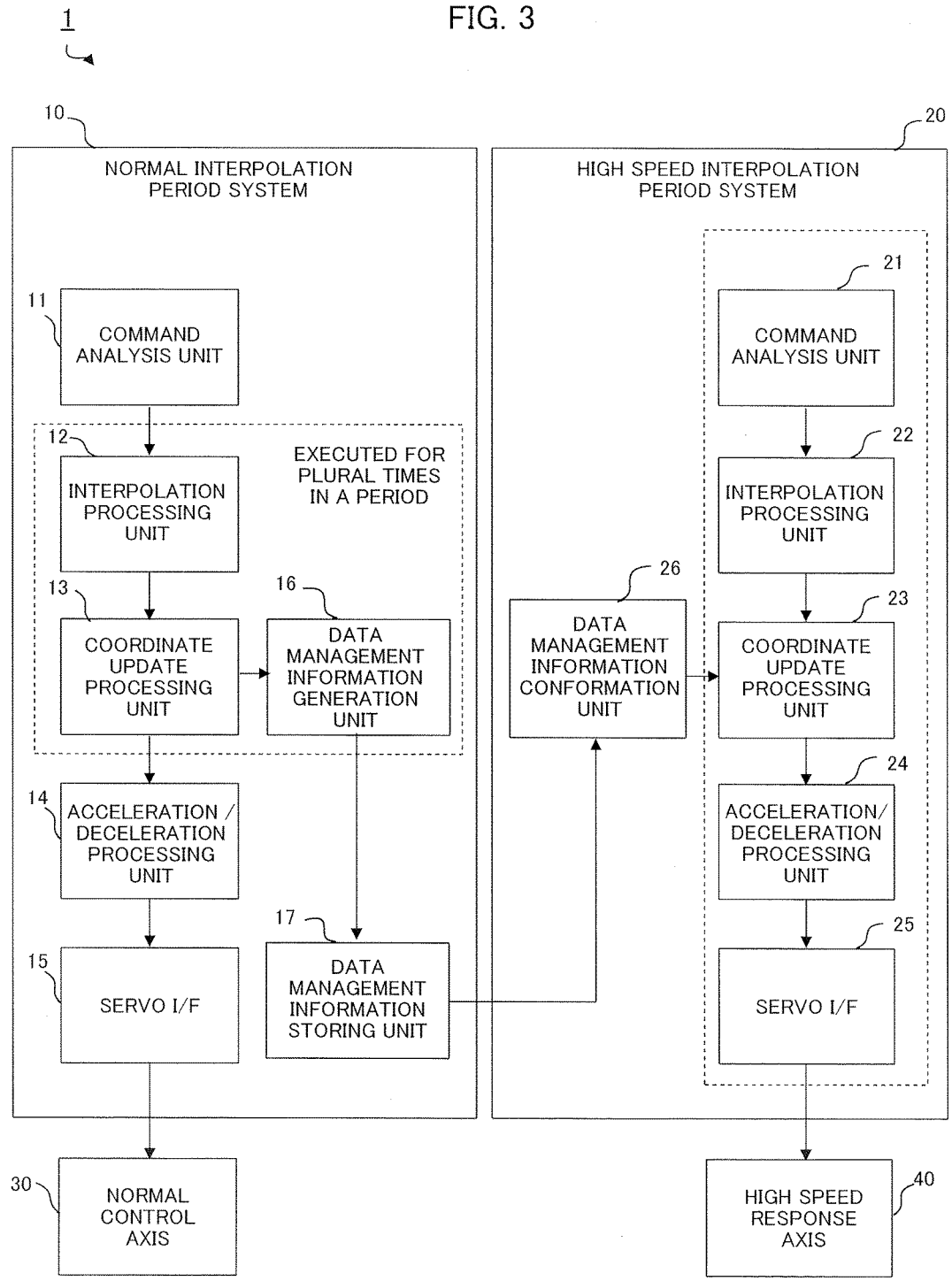
FIG. 3 is a function block diagram of a numerical control machine according to an embodiment of the present invention.

FIG. 3 is a function block diagram of a numerical control machine according to an embodiment of the present invention. It should be noted that, in FIG. 3, one normal interpolation period system and one high speed interpolation period system are described, for simplifying the description, though the numerical control device may include plural systems.

A numerical control device 1 includes a normal interpolation period system 10 and a high speed interpolation period system 20 which is controlled in synchronization with the normal interpolation period system 10.

The normal interpolation period system 10 includes a command analysis unit 11, an interpolation processing unit 12, a coordinate update processing unit 13, an acceleration/deceleration processing unit 14, a servo I/F 15, a data management information generation unit 16, and a data management information storing unit 17.

The command analysis unit 11 analyzes machining program to be executed at the normal interpolation period system 10, and generates command data for designating movement command of a normal control axis 30. The interpolation processing unit 12 executes interpolation processing based on the command data generated by command analysis unit 11 and generates interpolation data. The coordinate update processing unit 13 updates coordinate value of the normal control axis 30 based on the interpolation data generated by the interpolation processing unit 12, and calculates machine coordinate value of the normal control axis 30. The acceleration/deceleration processing unit 14 executes acceleration/deceleration processing based on the machine coordinate value updated by the coordinate update processing unit 13, and drives and controls the normal control axis 30 through the servo I/F 15.

The data management information generation unit 16 generates data management information representing status of the normal interpolation period system based on various data generated by the command analysis unit 11, the interpolation processing unit 12, and the coordinate update processing unit 13, and stores the data management information in the data management information storing unit 17 provided in a memory (not shown in the figure) or the like of the numerical control device 1. The data management information can be used for determining timing for starting cycle (start of the machining program) or executing auxiliary function by monitoring by the high speed interpolation period system, such as sequence number of the currently executed block of the machining program at the normal interpolation period system, overlap timing and 1 ms current position. As the data management information, any information which can be used for synchronization control, other than the information described above, may also be generated and stored.

A technical feature of the present invention is that processing of the interpolation processing unit 12, the coordinate update processing unit 13, and the data management information generation unit 16 is executed by looping for plural times according to system ratio of the interpolation period of the normal interpolation period system 10 and the interpolation period of the high speed interpolation period system 20. By executing the processing as above, pieces of the data management information are generated for a number of the high speed interpolation periods to be executed in a normal interpolation period, at a normal interpolation period. It should be noted that, in the present invention, a function to be executed by looping for plural times only includes processing with light load such as the interpolation processing, the coordinate update processing, and the data management information generation processing, and does not include process with heavy load such as acceleration/deceleration processing, such that high speed response is enabled without introducing a high capacity CPU.

As mentioned above, in order to control reading of the plural pieces of the data management information generated in an interpolation period by the high speed interpolation period system, the data management information generation unit 16 stores the generated data management information, in association with information prescribing which interpolation period of the high speed interpolation period system the data management information can be referred to. Here, when the data management information is stored without defining the information prescribing the interpolation period which can be referred to, the data management information is referred to at the nearest high speed interpolation period each time when the information is generated as the method described above, and when each data management information is allocated with number in ascending order, each data management information may be referred to in the order at each interpolation period of the high speed interpolation period, as the method b described above.

The high speed interpolation period system 20 includes a command analysis unit 21, an interpolation processing unit 22, a coordinate update processing unit 23, an acceleration/deceleration processing unit 24, a servo I/F 25, and a data management information confirmation unit 26.

The command analysis unit 21 analyzes machining program to be executed at the high speed interpolation period system 20, and generates command data for designating movement command of a high speed response axis 40. The interpolation processing unit 22 executes interpolation processing based on the command data generated by command analysis unit 21 and generates interpolation data. The coordinate update processing unit 23 updates coordinate value of the high speed response axis 40 based on the interpolation data generated by the interpolation processing unit 22, and calculates machine coordinate value of the high speed response axis 40. The acceleration/deceleration processing unit 24 executes acceleration/deceleration processing based on the machine coordinate value updated by the coordinate update processing unit 23, and drives and controls the high speed response axis 40 through the servo I/F 25.

The data management information confirmation unit 26 monitors the data management information storing unit 17 in the normal interpolation period system 10, and control operation of each functional unit of the high speed interpolation period system 20 based on the data management information stored in the data management information storing unit 17. As an example of the control, the data management information confirmation unit 26 starts driving control of the high speed response axis 40 based on the machining program by commanding each functional unit when the data management information confirmation unit 26 determines that timing for starting cycle of the machining program has arrived using the sequence number in the data management information. Similarly, the data management information confirmation unit 26 may start the driving control of the high speed response axis 40 based on overlap timing or the coordinate value of the normal control axis 30.

With the above configuration, since the data management information confirmation unit 26 operates monitoring at the interpolation period of the high speed interpolation period system 20, the data management information generated in the normal interpolation period system 10 can be read at high speed not depending on the interpolation period of the normal interpolation period system 10, and the high speed response axis 40 can be driven corresponding at high speed to the operation of the normal control axis 30.

Figure 4:
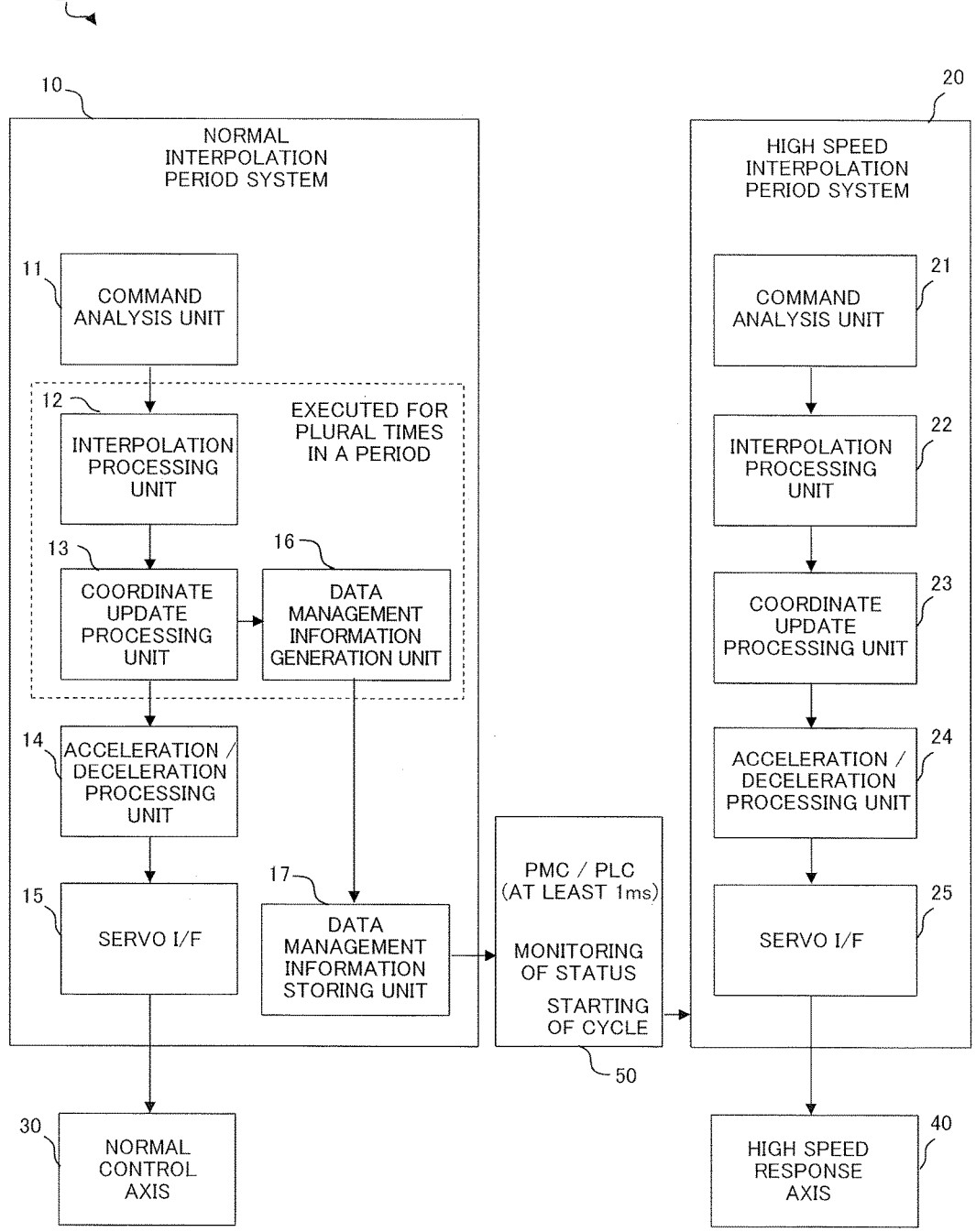
FIG. 4 is a function block diagram of a numerical control machine according to another embodiment of the present invention.

It should be noted that, as a modified example of the present embodiment, a PMC or a PLC may work as the data management information confirmation unit 26. As shown in FIG. 4, a PMC/PLC 50 may monitor the data management information to be stored in the data management information storing unit 17 of the normal interpolation period system 10 at, for example, 1 ms period, and the PMC/PLC 50 may start the driving control of the high speed response axis 40 by commanding the high speed interpolation period system 20 when condition for starting cycle is satisfied, implementing the same function as above.

Alternatively, monitoring by the data management information confirmation unit 26 of the high speed interpolation period system 20 and the monitoring by the PMC or the PLC may be configured to be performed in parallel.

Figure 5:
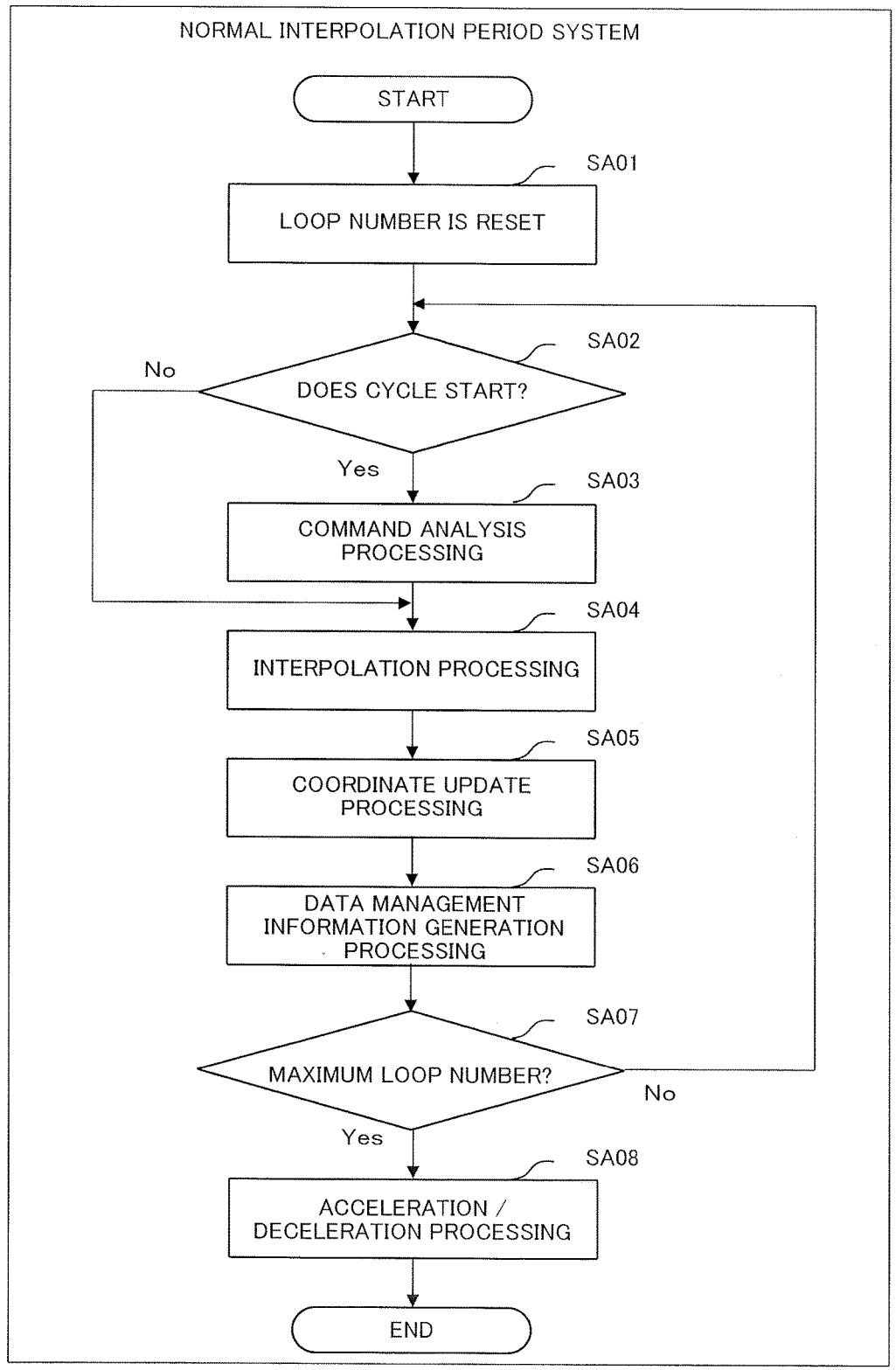
FIG. 5 is a flowchart of processing executed at a normal interpolation period system according to an embodiment of the present invention.

FIG. 5 is a schematic flowchart of processing executed at the normal interpolation period system 10 in the present invention. The processing is executed at each interpolation cycle of the normal interpolation period system 10.

[Step SA01] Loop number of Step SA02 to Step SA06 in the current interpolation period is initialized.

[Step SA02] It is determined whether it is at stage of starting cycle of execution of the machining program or not. The process proceeds to Step SA03 when it is at the stage of starting cycle, and proceeds to Step SA04 when not.

[Step SA03] The command analysis unit 11 reads a block of the machining program from the memory and analyzes the block to generate command data designating movement command of the normal control axis 30.

[Step SA04] The interpolation processing unit 12 executes interpolation processing of the current normal interpolation period based on the command data generated by the command analysis unit 11, to generate interpolation data. Interpolation data of the current loop is generated in the loop from Step SA02 to Step SA07, in the generation of the interpolation data.

[Step SA05] The coordinate update processing unit 13 updates the coordinate value of the normal control axis 30 based on the interpolation data generated by the interpolation processing unit 12 and executes processing for calculating the machine coordinate of the normal control axis 30.

[Step SA06] The data management information generation unit 16 generates the data management information based on various kinds of data generated in Step SA03 to Step SA05, and stores the data management information in the data management information storing unit 17. The data management information is allocated with a number designating at which loop the data is generated when the data management information is stored, if necessary.

[Step SA07] It is determined whether the number of loops reaches the maximum loop number (system ratio to the high speed interpolation period system 20 to be controlled in synchronization with). The process proceeds to Step SA08 when the number of loops reaches the maximum loop number, while the number of loop sis incremented and the process returns to Step SA02 when not.

[Step SA08] The acceleration/deceleration processing unit 24 executes the acceleration/deceleration processing based on the machine coordinate value updated by the coordinate update processing unit 23, and drives and controls the high speed response axis 40 through the servo I/F 25.

Figure 6:
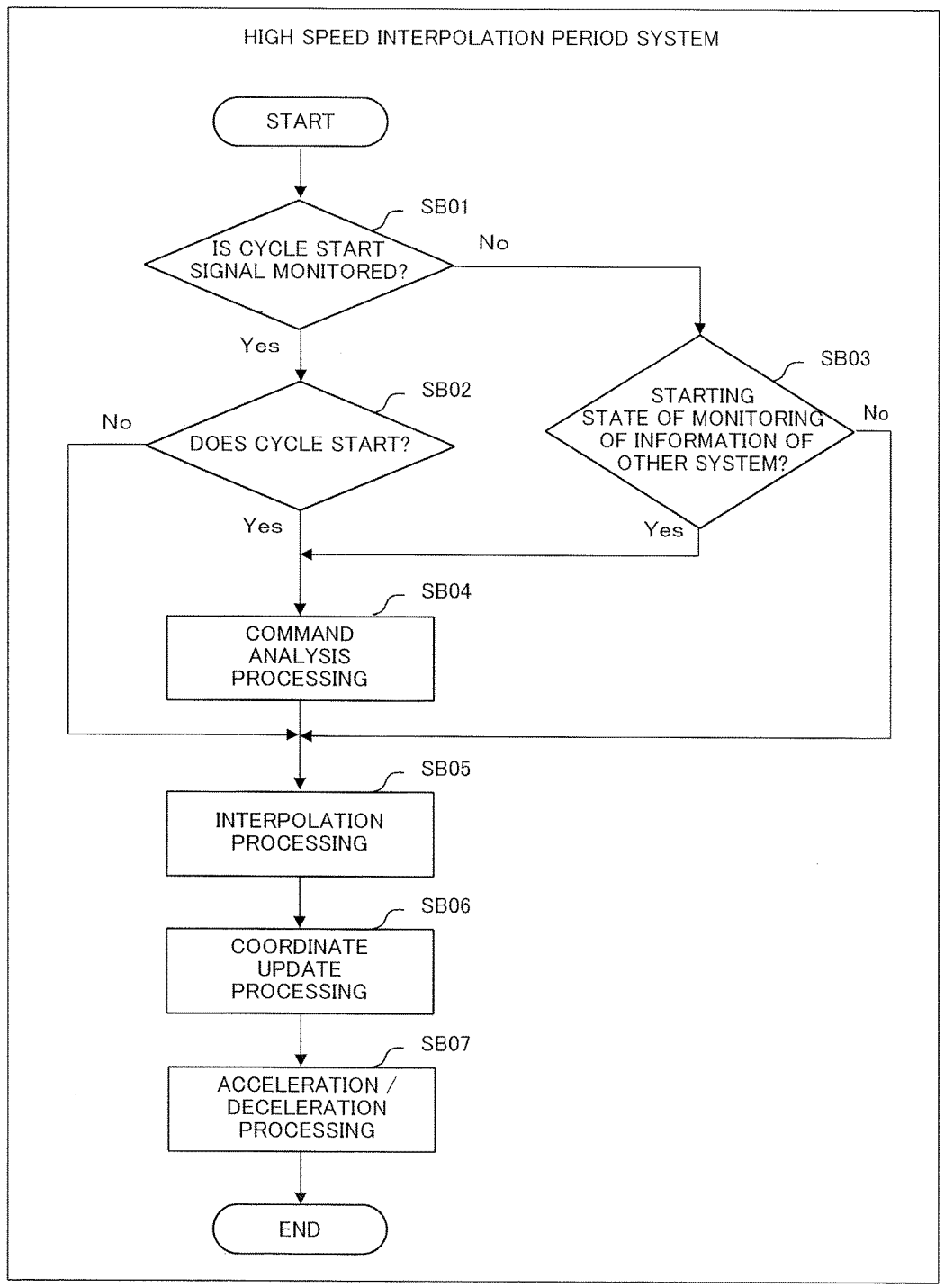
FIG. 6 is a flowchart of processing executed at a high speed interpolation period system according to an embodiment of the present invention.
Figure 7:
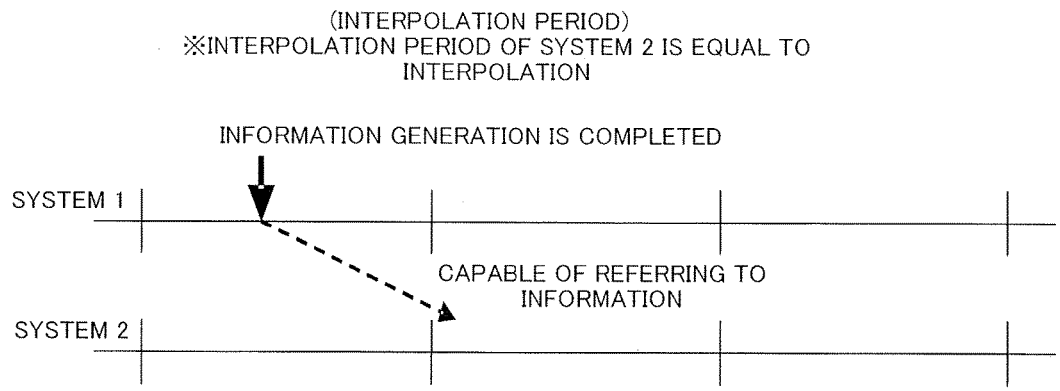
FIG. 7 is a diagram illustrating a problem in multiple system control in a prior art.
Figure 8:
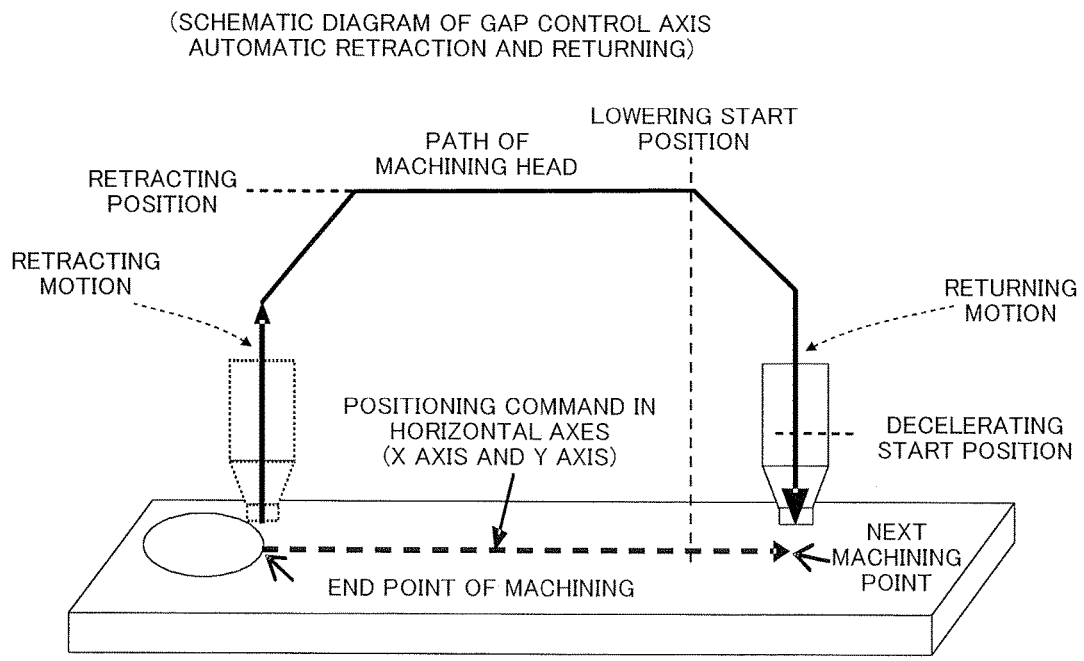
FIG. 8 is a diagram illustrating gap control in a prior art.

FIG. 6 is a schematic flowchart of processing executed at the high speed interpolation period system 20 of the present invention. The processing is executed at each interpolation period of the high speed interpolation period system 20. It should be noted that, the flowchart shows processing flow in which monitoring by the data management information confirmation unit 26 of the high speed interpolation period system 20 and monitoring by the PMC or the PLC are performed in parallel.

[Step SB01] It is determined whether the PMC/PLC 50 outputs signal of starting cycle. The process proceeds to Step SB02 when the signal is output, and proceeds to Step SB03 when not.

[Step SB02] It is determined whether it is at stage of starting cycle of execution of the machining program or not. The process proceeds to Step SB04 when it is at the stage of starting cycle, and proceeds to Step SB05 when not.

[Step SB03] The data management information confirmation unit 26 determines whether it is at status of starting cycle of the high speed interpolation period system 20 or not based on the data management information stored in the data management information storing unit 17 of the normal interpolation period system 10 to be monitored. The process proceeds to Step SB04 when it is at the status of starting cycle, and proceeds to Step SB05 when not.

[Step SB04] The command analysis unit 21 reads a block of the machining program from the memory and analyzes the block to generate command data designating movement command of the high speed response axis 40.

[Step SB05] The interpolation processing unit 22 executes interpolation processing of the current normal interpolation period based on the command data generated by the command analysis unit 21, to generate interpolation data.

[Step SB06] The coordinate update processing unit 23 updates the coordinate value of the high speed response axis 40 based on the interpolation data generated by the interpolation processing unit 22 and executes processing for calculating the machine coordinate of the high speed response axis 40.

[Step SB07] The acceleration/deceleration processing unit 24 executes the acceleration/deceleration processing based on the machine coordinate value updated by the coordinate update processing unit 23, and drives and controls the high speed response axis 40 through the servo I/F 25.

The embodiments of the present invention are described above. The present invention is not limited to the above-described embodiments, and, the configuration thereof can be appropriately modified to be implemented in the other embodiments.

The invention claimed is:

1. A multiple system numerical control device for executing multiple system control for dividing plural axes to be controlled to plural systems and controlling each system based on different machining program in parallel, wherein
the plural systems includes a normal interpolation period system configured to operate at normal interpolation period and control a first control axis, and a high speed interpolation period system configured to operate at high speed interpolation period shorter than the normal interpolation period and control a second control axis,
the normal interpolation period system comprises:
a first command analysis unit configured to analyze a first machining program and generate a first command data;
a first interpolation processing unit configured to execute interpolation processing based on the first command data and generate a first interpolation data;
a first coordinate update processing unit configured to update coordinate value of the first control axis based on the first interpolation data;
a first acceleration/deceleration processing unit configured to execute acceleration/deceleration processing based on the coordinate value of the first control axis and generate a first acceleration/deceleration data;
a data management information generation unit configured to generate data management information representing status of the normal interpolation period system based on at least one of the first command data, the first interpolation data, and the coordinate value of the first control axis; and
a data management information storing unit configured to store the data management information; and
the high speed interpolation system comprises:
a second command analysis unit configured to analyze a second machining program and generate a second command data;
a second interpolation processing unit configured to execute interpolation processing based on the second command data and generate a second interpolation data;
a second coordinate update processing unit configured to update coordinate value of the second control axis based on the second interpolation data;
a second acceleration/deceleration processing unit configured to execute acceleration/deceleration processing based on the coordinate value of the second control axis and generate a second acceleration/deceleration data; and
a data management information confirmation unit configured to control operation of the second command analysis unit, the second interpolation processing unit, the second coordinate value update processing unit, and the second acceleration/deceleration processing unit; wherein
processing in the normal interpolation period system executed in the first interpolation processing unit, the first coordinate update processing unit, and the data management information generation unit are executed by looping for plural times in a normal interpolation period according to a system ratio of the normal interpolation period and the high speed interpolation period.

2. A multiple system numerical control device for executing multiple system control for dividing plural axes to be controlled to plural systems and controlling each system based on different machining program in parallel, the multiple system numerical control device including a programmable controller, wherein
the plural systems includes a normal interpolation period system configured to operate at normal interpolation period and control a first control axis, and a high speed interpolation period system configured to operate at high speed interpolation period shorter than the normal interpolation period and control a second control axis,
the normal interpolation period system comprises:
a first command analysis unit configured to analyze a first machining program and generate a first command data;
a first interpolation processing unit configured to execute interpolation processing based on the first command data and generate a first interpolation data;
a first coordinate update processing unit configured to update coordinate value of the first control axis based on the first interpolation data;
a first acceleration/deceleration processing unit configured to execute acceleration/deceleration processing based on the coordinate value of the first control axis and generate a first acceleration/deceleration data;
a data management information generation unit configured to generate data management information representing status of the normal interpolation period system based on at least one of the first command data, the first interpolation data, and the coordinate value of the first control axis; and
a data management information storing unit configured to store the data management information; and
the high speed interpolation system comprises:
a second command analysis unit configured to analyze a second machining program and generate a second command data;
a second interpolation processing unit configured to execute interpolation processing based on the second command data and generate a second interpolation data;
a second coordinate update processing unit configured to update coordinate value of the second control axis based on the second interpolation data; and
a second acceleration/deceleration processing unit configured to execute acceleration/deceleration processing based on the coordinate value of the second control axis and generate a second acceleration/deceleration data; wherein
the programmable controller is configured to output a signal to control operation of the second command analysis unit, the second interpolation processing unit, the second coordinate value update processing unit, and the second acceleration/deceleration processing unit to the high speed interpolation system based on the data management information stored in the data management information storing unit, and
processing in the normal interpolation period system executed in the first interpolation processing unit, the first coordinate update processing unit, and the data management information generation unit are executed by looping for plural times in a normal interpolation period according to a system ratio of the normal interpolation period and the high speed interpolation period.

3. A multiple system numerical control device according to claim 1, wherein the data management information includes at least one of sequence number of a currently executed block of the first machining program executed in the normal interpolation period system, overlap timing, and 1 ms current coordinate value of the normal control axis.

4. A multiple system numerical control device according to claim 2, wherein the data management information includes at least one of sequence number of a currently executed block of the first machining program executed in the normal interpolation period system, overlap timing, and 1 ms current coordinate value of the normal control axis.

* * * * *